(12) United States Patent
Kubo et al.

(10) Patent No.: US 7,992,875 B2
(45) Date of Patent: Aug. 9, 2011

(54) WEATHER STRIP AND METHOD FOR MANUFACTURING THE SAME

(75) Inventors: Yoshihisa Kubo, Aichi-ken (JP); Hideaki Minoura, Aichi-ken (JP); Tomonori Inoue, Aichi-ken (JP)

(73) Assignee: Toyoda Gosei Co., Ltd., Nishikasugai-Gun, Aichi-Ken (JP)

(*) Notice: Subject to any disclaimer, the term of this patent is extended or adjusted under 35 U.S.C. 154(b) by 595 days.

(21) Appl. No.: 12/149,060

(22) Filed: Apr. 25, 2008

(65) Prior Publication Data

US 2008/0265616 A1 Oct. 30, 2008

(30) Foreign Application Priority Data

Apr. 27, 2007 (JP) ............... P2007-119120
Jan. 29, 2008 (JP) ............... P2008-017328

(51) Int. Cl.
*F16J 15/02* (2006.01)
*E06B 7/16* (2006.01)
*E06B 7/22* (2006.01)

(52) U.S. Cl. ....... 277/630; 277/640; 277/921; 49/492.1; 49/498.1

(58) Field of Classification Search ............... 277/630, 277/921, 640; 49/492.1, 498.1; 24/292
See application file for complete search history.

(56) References Cited

U.S. PATENT DOCUMENTS

| | | | | |
|---|---|---|---|---|
| 1,694,291 A | * | 12/1928 | Sywert | 49/492.1 |
| 2,638,642 A | * | 5/1953 | Spraragen | 49/492.1 |
| 3,213,494 A | * | 10/1965 | Mayers et al. | 49/492.1 |
| 4,864,774 A | * | 9/1989 | Onishi et al. | 49/440 |
| 6,386,619 B1 | * | 5/2002 | Tsuchida | 296/146.9 |
| 6,601,346 B2 | * | 8/2003 | Nozaki | 49/498.1 |
| 6,942,225 B2 | * | 9/2005 | Gentemann et al. | 277/641 |
| 2002/0112405 A1 | | 8/2002 | Nozaki | |
| 2003/0075878 A1 | * | 4/2003 | Sehr et al. | 277/630 |
| 2003/0213181 A1 | * | 11/2003 | Weil | 49/492.1 |
| 2004/0079032 A1 | * | 4/2004 | Russell et al. | 49/498.1 |
| 2005/0155294 A1 | * | 7/2005 | Masuda et al. | 49/498.1 |

(Continued)

FOREIGN PATENT DOCUMENTS

JP 59-20016 2/1984

(Continued)

OTHER PUBLICATIONS

Chinese Office Action dated Dec. 4, 2009, with English translation.

(Continued)

*Primary Examiner* — Alison K Pickard
(74) *Attorney, Agent, or Firm* — McGinn IP Law Group, PLLC

(57) ABSTRACT

A door weather strip includes a base attached along the outer periphery of a door frame and a hollow seal, and a clip attached to the base. The clip includes an engaging part fit in and enageable with an attaching hole in the door frame and a retained part retained to the base. The retained part includes a retaining piece and a coupling portion coupling the center area of the retaining piece in the longitudinal direction and the engaging part. Using an inserting means equipped with an insertion pin which is nearly cylindrical and sharp-pointed, the insertion pin is pierced into the base so that the retaining piece is fed through the inner peripheral side of the insertion pin to the inner face side of the base, thereby attaching the clip to the base.

10 Claims, 10 Drawing Sheets

U.S. PATENT DOCUMENTS

2006/0230686 A1* 10/2006 Plum et al. .................. 49/498.1
2007/0163182 A1* 7/2007 Morihara .................... 49/492.1

FOREIGN PATENT DOCUMENTS

| JP | 2000-351325 | 12/2000 |
| JP | 2001-63381 | 3/2001 |
| JP | 2004-26089 | 1/2004 |

OTHER PUBLICATIONS

German Office Action dated Oct. 27, 2008 with English-Language Translation.

* cited by examiner

FIG. 9A
FIG. 9B
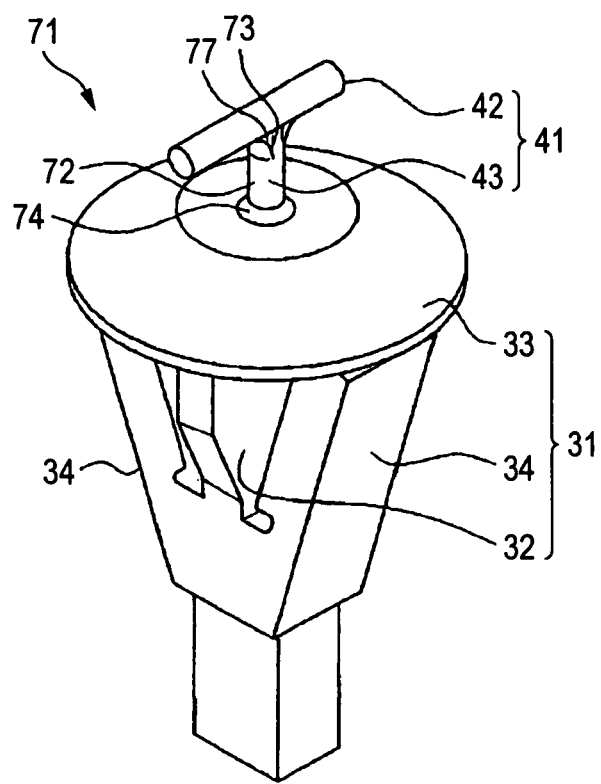
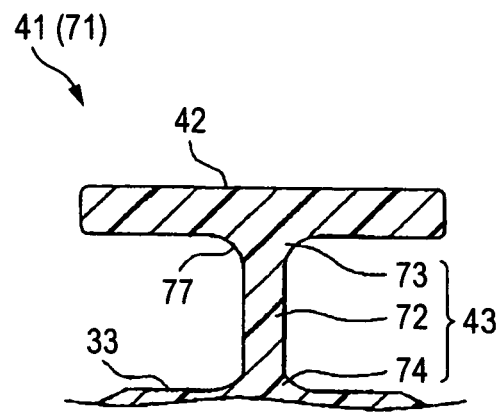

WEATHER STRIP AND METHOD FOR MANUFACTURING THE SAME

BACKGROUND OF THE INVENTION

1. Field of the Invention

This invention relates to a weather strip and a method for manufacturing the same.

2. Related Art

Generally, a weather strip is attached to the edge of an opening of a vehicle (automobile) body or the edge of a door for opening/closing the opening. For example, a door weather strip attached along the edge of the door includes an attaching base attached to the edge of the door and a seal integrally attached to the attaching base and having a hollow section. In closing the door, the seal of the door is brought into pressure contact with the edge of the door opening of the automobile body so that sealing is made between the door and the automobile body.

Meanwhile, as one of methods for attaching the weather strip, there is known a method using a clip (fastening tool) (for example, see JP-UM-A-59-20016). The clip employed for attachment includes an engaging part fit and engaged in an attaching hole formed at the opening edge of the vehicle or door edge and a retained part retained to the above attaching base. The retained part includes a nearly-bar-shaped retaining piece and a coupling portion coupling the nearly central area in the longitudinal direction of the retaining piece and the engaging part, and is wholly formed in a nearly T-shape.

In order to attach the clip described in JP-UM-A-59-20016 to the attaching base, it was necessary to form a passing-through hole for passing the retaining piece and coupling portion through the attaching base using a boring jig such as a gimlet or drill. In forming the passing-through hole, generated scraps must be removed by a sucking device or the like. Further, even if the sucking device is operated, if the generated scraps enter the interior of the weather strip (hollow part), it may be necessary to take out the generated scraps separately. Moreover, aside from the step of forming the passing-through hole, required is a step of screwing the retained part in the passing-through hole so that the securing piece is located in the hollow part inside the seal. This leads to an increase of the number of man hours. As described above, such a weather strip as attached to the door or body of the automobile was accompanied by various troubles in improving the manufacturing workability.

SUMMARY OF THE INVENTION

This invention has been accomplished in order to solve the above problems, and its object is to provide a weather strip capable of improving the manufacturing workability of a weather strip provided with a clip attached to the attached portion such as the opening edge of the vehicle or door edge and a method for manufacturing the same.

An explanation will be given of each of the means suitable to attain the above object as individual items listed below. As the occasion demands, the operational effect peculiar to the corresponding means will be added.

Means 1: A weather strip comprising an attaching base attached to an attached portion, a seal extending out from the attaching base and a fastening tool attached to the attaching base, wherein the fastening tool includes an engaging part fit in and enagageable with an attaching hole formed in the attached portion and a retained part retained to the attaching base;

the engaging part includes a rod-like axis, a flange extending from the one end thereof and a supporting portion extending outwardly and toward the flange from the outer periphery of the axis;

the retained part includes a retaining piece located on the inner face side of the attaching base and a coupling portion extending in a direction crossing the longitudinal direction of the retaining piece to pass through the attaching base and coupled with the flange;

the engaging part projecting from the attaching base is fit in the attaching hole so that the peripheral edge of the attaching hole is sandwiched between the flange and the tip of the supporting portion; and using an inserting means equipped with an insertion pin which is nearly cylindrical and sharp-pointed, the insertion pin is pierced into the attaching base from its bottom side so that the retaining piece is fed through the inner peripheral side of the insertion pin to the inner face side of the attaching base opposite to the bottom side, thereby attaching the fastening tool to the attaching base.

In accordance with the means 1, the weather strip 5 is provided with the fastening tool having the engaging part fit in and engaged with the attaching hole. The fastening tool is attached to the attaching base by feeding the retained part into the first hollow section through the inner peripheral side of the insertion pin pierced in the attaching base. Therefore, in order to attach the fastening tool to the attaching base, the operation of cutting away or scraping the substance of the attaching base to form an opening (hole) can be done without. Thus, it is possible to avoid generation of scraps attendant on forming the opening, thereby omitting the labor of removing the generated scraps and device (sucking device). As a result, the manufacturing workability and the quality can be improved. Further, in a sense, since the fastening tool can be attached to the weather strip in a single step, the working efficiency can be improved as compared with the prior art necessitating the step of previously forming the opening in the attaching base and the step of passing the fastening tool through the opening. Accordingly, the manufacturing workability of the weather strip attached to the attached portion using the fastening tool and so the productivity can be improved.

Incidentally, "attached to the attached portion" may also be "attached along the peripheral edge of an opening of a vehicle or the peripheral edge of a door for opening/closing the opening". Further, the coupling portion may couple the intermediate area in the longitudinal direction of the retaining piece with the engaging part. In this case, the retained state of the retained part can be stabilized. Further, the retaining piece may be formed in a linear shape. In this case, the secure piece can easily passed to the inner peripheral side of the insertion pin, thereby improving the attaching workability of the retained part to the attaching base.

Means 2: A weather strip according to means 1, wherein the distance from the secure piece to the flange is set to be smaller than the thickness of the attaching base sandwiched between the retaining piece and the flange in the retained state of the retained part.

In accordance with the means 2, the distance from the retaining piece to the flange is smaller than the thickness of the attaching base sandwiched between the retaining piece and the flange. This prevents the wobbling of the fastening tool for the attaching base. As a result, the attached state of the door weather strip to the attached portion can be stabilized.

Means 3: A weather strip according to means 1 or 2, wherein the coupling portion is flexible.

In accordance with the means 3, since the coupling portion is flexible, in passing the retained part through the attaching base, the shape of the coupling portion can be changed correspondingly. Thus, the retaining piece can be pushed into the inner face side of the attaching base comfortably and surely.

Means 4: A weather strip according to any one of means 1 to 3, wherein the retaining piece has higher rigidity than that of the coupling portion.

In accordance with the means 4, after the fastening tool has been attached, it is possible to suppress the situation where the retained part comes off the attaching base owing to flexing of the retaining piece.

Means 5: A weather strip according to any one of means 1 to 4, wherein the coupling portion has a retaining side reinforcing portion which is thicker than its remaining general region at its boundary to the retaining piece, and the wall thickness of the retaining side reinforcing portion increases gradually and continuously toward the end on the side of the retaining piece of the coupling portion.

In accordance with the means 5, since the retaining side reinforcing portion is provided, when the fastening tool is deformed so that the angle formed by the coupling portion and the retaining piece spreads, the stress applied to the boundary between the coupling portion and the retaining piece can be dispersed (concentration of the stress is suppressed). Therefore, in attaching the fastening tool to the attaching base, it is possible to suppress the situation where the fastening tool is broken at the boundary between the coupling portion and the retaining piece. Further, when stress is applied in the direction of come-off of the attaching tool in the attached state of the attaching tool to the attaching base, it is possible to suppress the situation where the fastening tool is broken at the boundary between the coupling portion and the retaining piece. Further, since the entire coupling portion is not necessarily made thick, it is possible to avoid the situation where in attaching the fastening tool to the attaching base, the attaching workability is deteriorated owing to difficulty of deformation of the coupling portion.

Incidentally, "in the retaining side reinforcing portion, its slope located on the outer peripheral side of the coupling portion than the general region may be curved to be concaved toward the retaining piece". This more surely provides an operational advantage that in attaching the fastening tool to the attaching base, the retaining side reinforcing portion can be passed to the attaching base relatively smoothly. Further, in passing the retaining piece to the attaching base, the retaining side reinforcing portion (a part thereof) can be correspondingly changed in its shape. Thus, it is possible to more surely suppress the situation where the workability of attaching the fastening tool to the attaching base (passing workability of the retaining piece) is deteriorated owing to the provision of the retaining side reinforcing portion.

Means 6: A weather strip according to means 5, wherein the retaining side reinforcing portion is constructed by making the coupling portion thick in an extending direction of the secure piece, and the wall thickness of the retaining side reinforcing portion in a direction perpendicular to the extending direction of the retaining piece is equal or nearly equal to that of the general region.

In accordance with the means 6, in the direction perpendicular to the extending direction of the retaining piece, the wall thickness of the retaining side reinforcing portion is equal or nearly equal to that of the general region. For this reason, as compared with the case where in the direction perpendicular to the extending direction of the retaining piece, the wall thickness of the retaining side reinforcing portion is thicker than that of the general region, interference between the retaining side reinforcing portion and the insertion pin (inner periphery of the insertion pin) can be suppressed. So, in attaching the fastening tool to the attaching base, the retaining piece can be fed out stably and smoothly to the inner face side of the attaching base. Further, in feeding out the retaining piece to the inner face side of the attaching base, interference between the retaining side reinforcing portion and the attaching base can be suppressed. So, the retaining side reinforcing portion can be relatively smoothly passed to the attaching base.

Means 7: A weather strip according to any one of means 1 to 6, wherein the coupling portion has a flange side reinforcing portion which is thicker than its remaining general region at its boundary to the retaining piece, and the wall thickness of the flange side reinforcing portion increases gradually and continuously toward the end on the side of the flange of the coupling portion.

In accordance with the means 7, since the flange side reinforcing portion is provided, when the fastening tool is deformed so that the angle formed by the coupling portion and the flange spreads, the stress applied to the boundary between the coupling portion and the flange can be dispersed (concentration of the stress is suppressed). Therefore, in attaching the fastening tool to the attaching base, it is possible to suppress the situation where the fastening tool is broken at the boundary between the coupling portion and the flange. Further, when stress is applied in the direction of come-off of the attaching tool in the attached state of the attaching tool to the attaching base, it is possible to suppress the situation where the fastening tool is broken at the boundary between the coupling portion and the flange. Further, since the entire coupling portion is not necessarily made thick, it is possible to avoid the situation where in attaching the fastening tool to the attaching base, the attaching workability is deteriorated owing to difficulty of deformation of the coupling portion.

Incidentally, "the flange side reinforcing portion may be constructed by making the coupling portion thick over the entire zone in the circumferential direction of the coupling portion. For this reason, where such stress as displacing the door weather strip in its longitudinal direction or vehicle-width direction is applied to the weather strip in the state attached to the attached portion, it is possible to avoid more surely the situation where the fastening tool is broken at the boundary between the coupling portion and the flange.

Means 8: A method for manufacturing the weather strip according to any one of means 1 to 7, comprising a molding step of molding a weather strip body including the attaching base and the seal; and an attaching step of attaching the fastening tool to the weather strip body using the inserting means, wherein the inserting means includes an insertion pin nearly cylindrical for passing the retaining piece on its inner peripheral side and a pushing means capable of pushing out the retaining piece located on the inner peripheral side of the insertion pin from the tip of the insertion pin;

the insertion pin is formed in a sharp-pointed shape, extends in the longitudinal direction and is provided with a slit having a width permitting the coupling portion to pass; and the attaching step includes a step of piercing the insertion pin with the retaining piece set on its inner peripheral side into the attaching base, a step of pushing out the retaining piece toward the inner face side of the attaching base by the pushing means, and a step of extracting the insertion pin.

In accordance with the means 8, since the method experiences the attaching step, it provides a state where the secure piece is located on the inner face side of the attaching base and the coupling portion is passed through the attaching base, thereby attaching the fastening tool to the weather strip body. The weather strip having the operational advantage given by each of the means described above can be surely obtained.

Means 9: A method for manufacturing a weather strip according to claim 8, wherein the slit has a width preventing the retaining piece inserted in the insertion pin from coming off.

In accordance with means 9, since there is no fear that the retaining piece comes off the slit, the operation of inserting the retaining piece into the inner face side of the attaching base by the inserting means can be smoothly carried out.

Means 10: A method for manufacturing a weather strip according to claim 8 or 9, wherein at the tip of the insertion pin, a guide projecting toward the slit is formed and the projecting quantity of the guide increases gradually and continuously toward the tip of the insertion pin.

In accordance with the means 10, because of presence of the guide, in pushing out the secure piece from the tip of the insertion pin, the retaining piece can be inclined toward the side where the slit is formed (guided toward the engaging part). Thus, the operation of inclining the retaining piece pushed to the inner face side of the base can be smoothly performed. Further, in pushing out the retaining piece from the tip of the insertion pin, burden applied to the boundary (retaining piece reinforcing portion) between the coupling portion and the retaining piece can be relaxed. Particularly, as described in the above means 2, where the distance from the secure piece to the flange is smaller than the thickness of the attaching base, at the stage where the boundary between the coupling portion and the retaining piece is located on the inner face side of the attaching base, the coupling portion is in a tensional state. In this state, if such force as extending the coupling portion is applied, the boundary between the coupling portion and the retaining piece may suffer from great stress. However, by adopting this means 10, such stress can be suppressed. Accordingly, it is possible to prevent more surely the situation where the fastening tool is broken at the boundary between the coupling portion and the retaining piece.

Additionally, "the outer shape of the insertion pin may be formed in a linear shape". Specifically, where the tip of the insertion pin as well as its outer shape is flexed or curved in order to guide the retaining piece pushed out from the tip of the insertion pin toward the engaging part, in passing the insertion pin through the attaching base (piercing), the insertion pin may be difficult to be pushed in. Further, the hole formed in the attaching base by piercing the attaching base with the insertion pin may not be formed perpendicular and straight to the attaching base (straight to the thickness direction of the attaching base). On the other hand, if the insertion pin is linear, in passing the insertion pin through the attaching base, the insertion pin can be easily pushed in and the hole formed in the attaching base by perpendicularly piercing the base with the insertion pin can be formed perpendicularly and straight to the attaching base. Therefore, the operation of passing the insertion pin through the attaching base can be done relatively easily, and the coupling portion of the fastening tool in the state attached to the attaching base can be extended perpendicularly and straight to the attaching base. Thus, the attached state of the fastening tool can be stabilized.

BRIEF DESCRIPTION OF THE DRAWINGS

FIG. 9A is a perspective view of the clip in a still another embodiment of this invention, and FIG. 9B is a partial sectional view of the retained part of the clip in this embodiment of this invention.

DETAILED DESCRIPTION OF THE PREFERRED EMBODIMENTS

Figure 1:
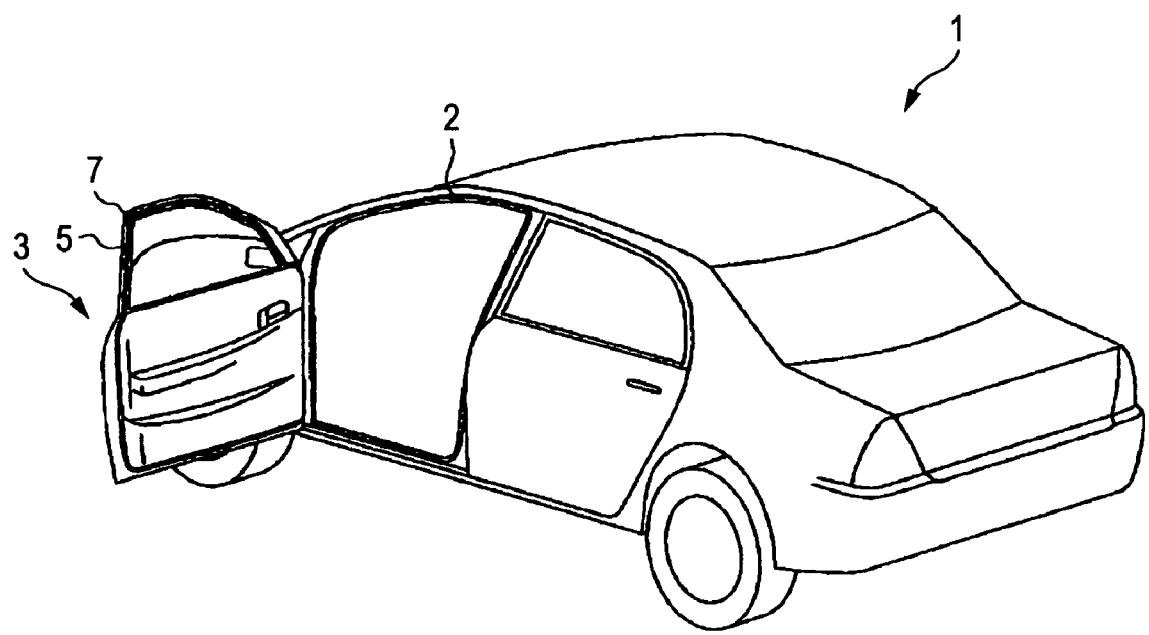
FIG. 1 is a perspective view of an automobile in the closed state of a front door.

Now referring to the drawings, an explanation will be given of an embodiment of this invention. As shown in FIG. 1, in a door opening 2 formed in the body of an automobile 1 serving as a vehicle, an automobile door (front door illustrated in the figure, hereinafter simply referred to as "door 3") is provided openably/closably. A door weather strip 5 is attached to the edge of the door 3. The nearly entire region in the longitudinal direction of the door weather strip 5 is formed of an extrusion formed by a predetermined extrusion machine, which is ring-shaped by connection of both ends in the longitudinal direction of the extrusion.

Figure 2:
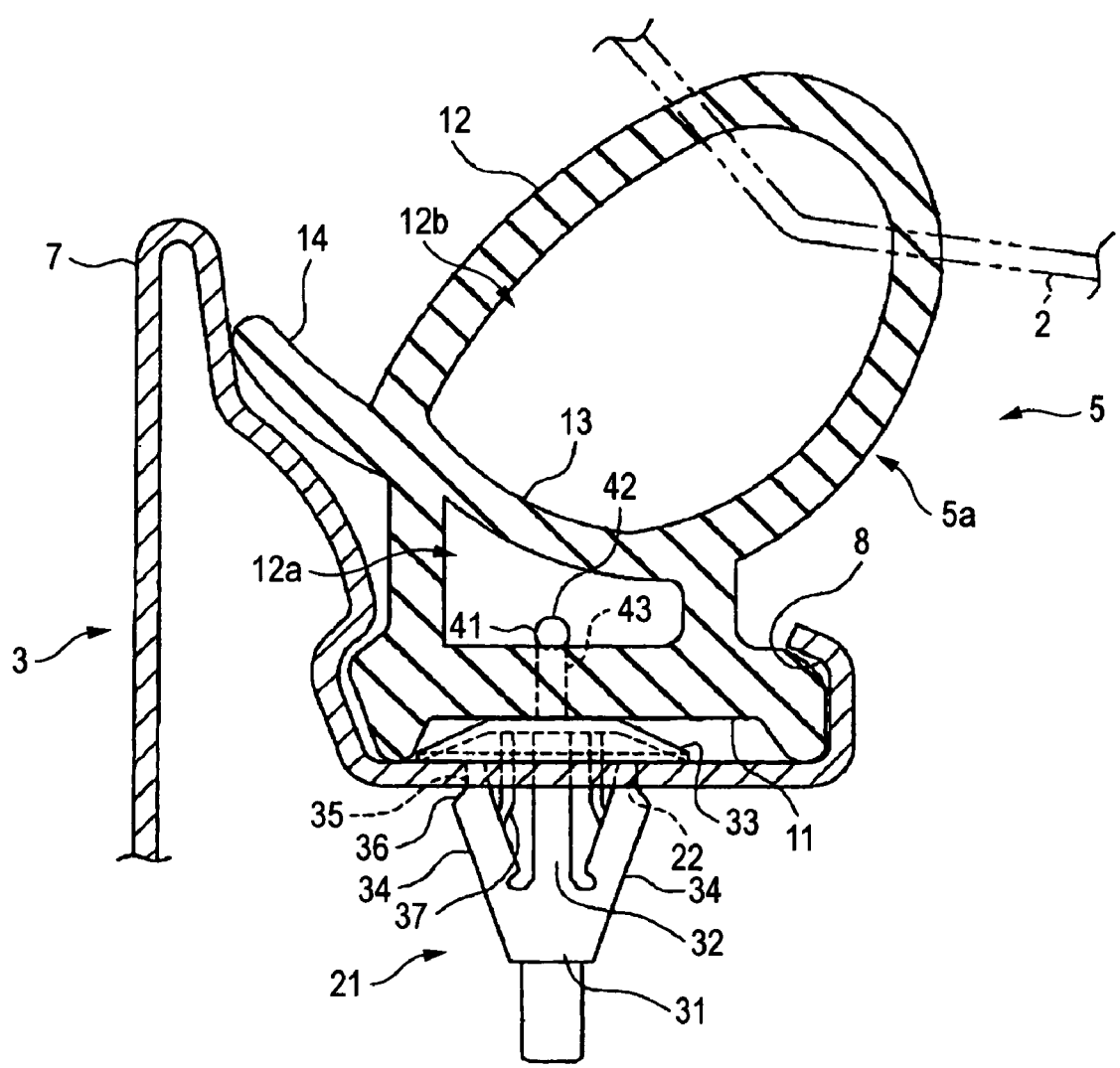
FIG. 2 is a sectional view of a door weather strip according to an embodiment of this invention.

As shown in FIG. 2, the door weather strip 5 includes a base 11 which serves as an attaching base fit in a nearly C-shaped sectional retainer 8 (attached portion) formed along the outer periphery of a door frame 7 and a hollow seal 12 extending out from the base 11. When the door 3 is closed, the seal 12 is brought into pressure-contact with the edge of the door opening 2 of the automobile body and is deformed. Thus, the portion between the automobile body and the door 3 is sealed. In this embodiment, the base 11 and seal 12 is made of EPDM (ethylene-propylene-diene copolymer).

The door weather strip 5 includes a bridge 13 which separates the hollow part formed inside the seal 12 into a first hollow section 12a on the inner peripheral side of the door frame 7 and a second hollow section 12b on the outer peripheral side thereof. In the extrusion, the bridge 13 is formed simultaneously with the base 11 and seal 12. The door weather strip 5 also has a lip 14 which projects outwardly of the vehicle from the vicinity of the root of the seal 12 at the vehicle outside. The tip of the lip 14 is to be brought into contact with the door frame 7 (portion extending out in the direction of the outer periphery of the door frame 7 at the vehicle outside of the door weather strip 5).

Meanwhile, a clip 21 serving as a hastening tool is attached to the base 11 at regular intervals along the longitudinal direction of the door weather strip 5. The clip 21 is fit in an attaching hole 22 formed in the retainer 8 and the base 11 is also fit in the inside of the retainer 8. In this way, the door weather strip 5 is attached to the door frame 7.

The clip 21 is made of synthetic resin such as polyoxymethylene or polyamide. As seen from FIG. 3 and others, the clip 21 includes an engaging part 31 fit and engaged in the attaching hole 22 and a retained part 41 retained in the base 11.

The engaging part 31 includes a bar-like axis 32, a flange 33 expanding like an umbrella from the one end of an axis 32 and a pair of supporting pieces 34 extending from the outer periphery of the axis 32 outwardly and toward the flange 33. The pair of supporting pieces 34 are located on the opposite sides with respect to the axis 32. The supporting pieces 34 are provided elastically-deformably so that they can lean around the vicinity of the boundary to the axis 32.

Further, as shown in FIG. 2, at the tip of each supporting piece 34, a projection 36 is formed to form a step 35 on the outer face. In addition, an auxiliary plate 37 is formed to couple the inner face of each supporting piece 34 and the flange 33.

Figure 3:
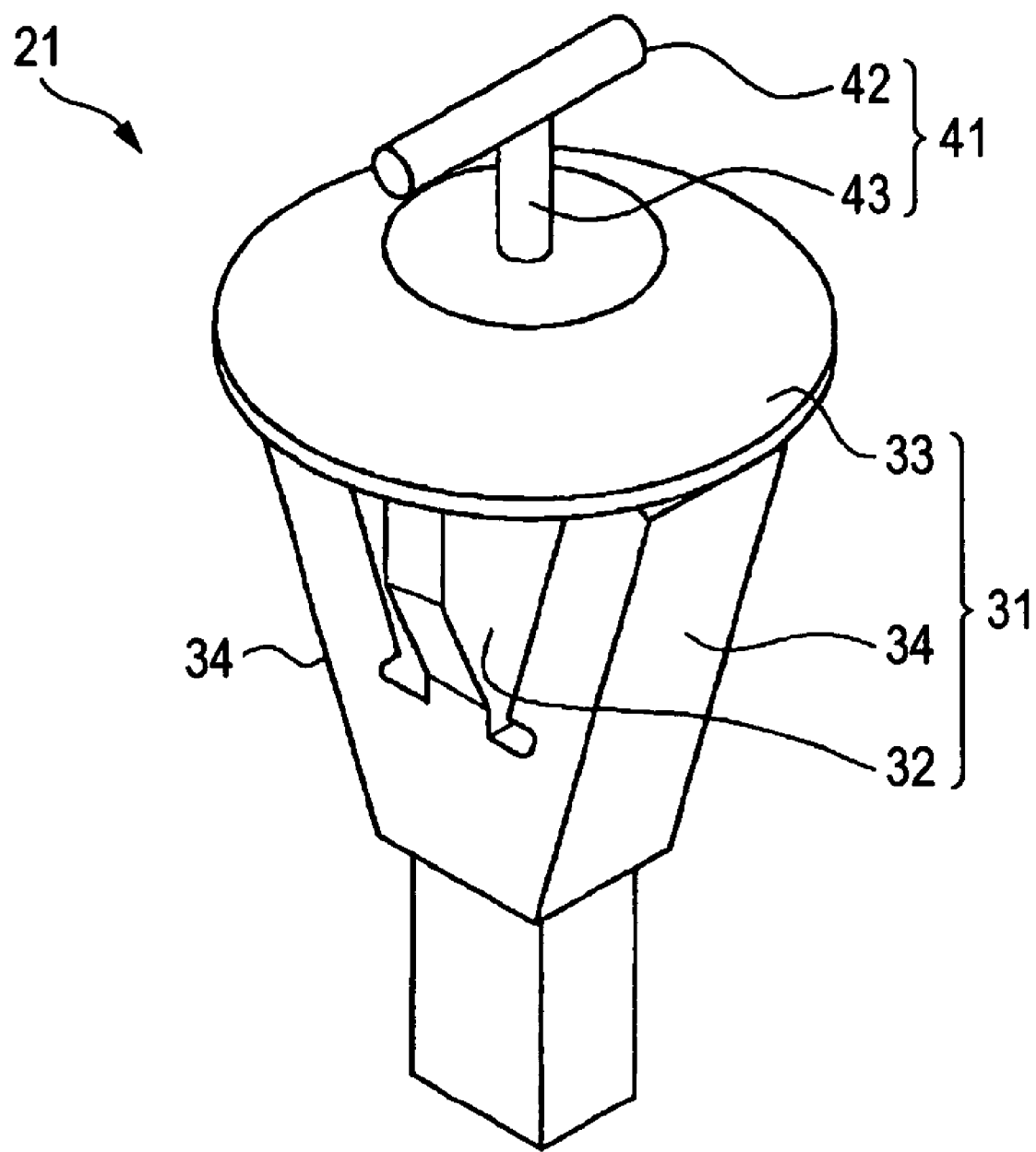
FIG. 3 is a perspective view of a clip.

As shown in FIG. 3 and others, the retained part 41 includes a pillar-like retaining piece 42 extending in a direction perpendicular to the extending direction of the axis 32 and a pillar-like coupling portion 43 coupling the center in the longitudinal direction of the retaining piece 42 and the center of the flange 33. The retained part 41 is wholly formed in a T-shape.

In a state where the clip 21 is attached to the base 11, the retaining piece 42 is located within the first hollow section 12a and the base 11 is sandwiched between the securing piece 42 and flange 33. In this embodiment, the distance from the retaining piece 42 and the flange 33 is set to be smaller than the thickness of the base 11 sandwiched between the retaining piece 42 and flange 33 in the state where the clip 21 is attached. For this reason, in the state where the clip 21 is attached to the base 11 (the retained part 41 is retained), the retaining piece 42 and flange 33 slightly cut into the base 11.

Further, in this embodiment, the coupling portion 43 is flexible so as to be enough to incline the retained part 41 by about 90° relative to the extending direction of the axis 32 (until it becomes in nearly parallel to the extending direction of the axis 32) and can be restored from that state to its nearly initial state by its own elastic force. In addition, the circumferential length of the retaining piece 42 is longer than that of the coupling portion 43.

In the state where the door weather strip 5 constructed as described above is attached to the retainer 8, the retainer 8 at the edge of the attaching hole 22 is sandwiched between the flange 33 and the tip (step 36) of the supporting piece 34. Further, in the attached state of the door weather strip 5, the projection 35 is located on the inner peripheral side of the attaching hole 22 so that the step 36 is engaged with the edge of the attaching hole 22. Thus, the clip 21 fit in the attaching hole 22 and so the door weather strip 5 can be prevented from being displaced.

The presence of the flanges 33 permits the edge of the attaching hole 22 to be sealed and prevents the engaging part 31 from being made difficult to fit in the attaching hole 22 because of excessive embedding of the clip 21 into the base 11.

An explanation will be given of the process for manufacturing the door weather strip 5.

First, EPDM non-cured rubber is continuously supplied to an extruding machine to extrude an intermediate mold (weather strip body 5a) from a dice. Subsequently, the weather strip 5a is cured and cooled. Thereafter, the surface of the seal 12 is subjected to surface treatment such as silicon coating.

Figure 7:
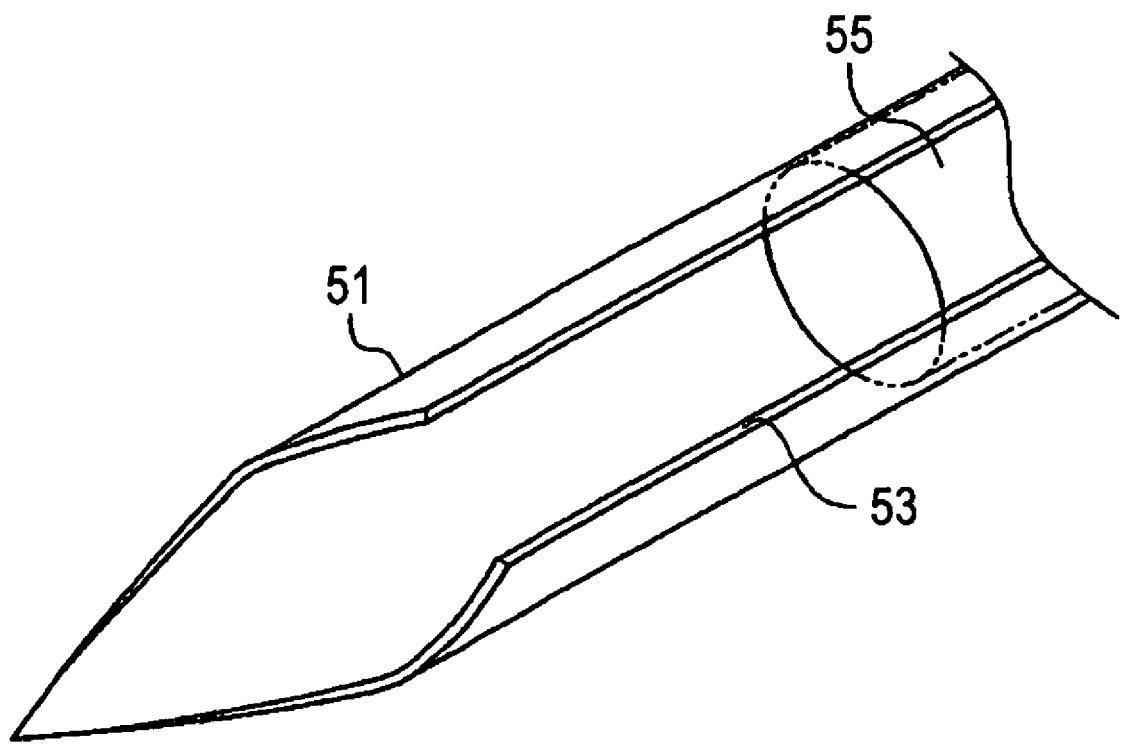
FIG. 7 is a perspective view of the tip of an inserting means.

Thereafter, the clip 21 is attached to the weather strip body 5a. In this embodiment, as shown in FIG. 7, the clip 21 is attached to the weather strip body 5a using an inserting means including a nearly cylindrical insertion pin 51 for passing the retaining piece 42 on its inner peripheral side and a pushing bar 55 (pushing means) slidable along the longitudinal direction of the insertion pin 51 on the inner peripheral side thereof.

A slit 53 permitting the coupling portion 43 to pass along the longitudinal direction of the insertion pin 51 is formed. The width of the slit 53 is larger than the diameter of the coupling portion 43 and smaller than that of the retaining piece 42. Thus, with the retaining piece 42 set on the inner peripheral side of the insertion pin 51, the clip 21 can be slid along the longitudinal direction of the insertion pin 51, and the retaining piece 42 is prevented from coming off the slit 53.

The tip of the insertion pin 51 is pointed like a needle. So, without previously forming an opening or the like on the base 11 of the weather strip body 5a, by pressing the tip on the base 11, the tip can be relatively smoothly pierced through the base 11. The circumferential length of the retaining piece 42 is shorter than that of the axis 32. This suppresses the situation where the diameter of the insertion pin 51 for passing the retaining piece 42 becomes so large that it is difficult to pierce the insertion pin 51 into the base 11.

Figure 4:
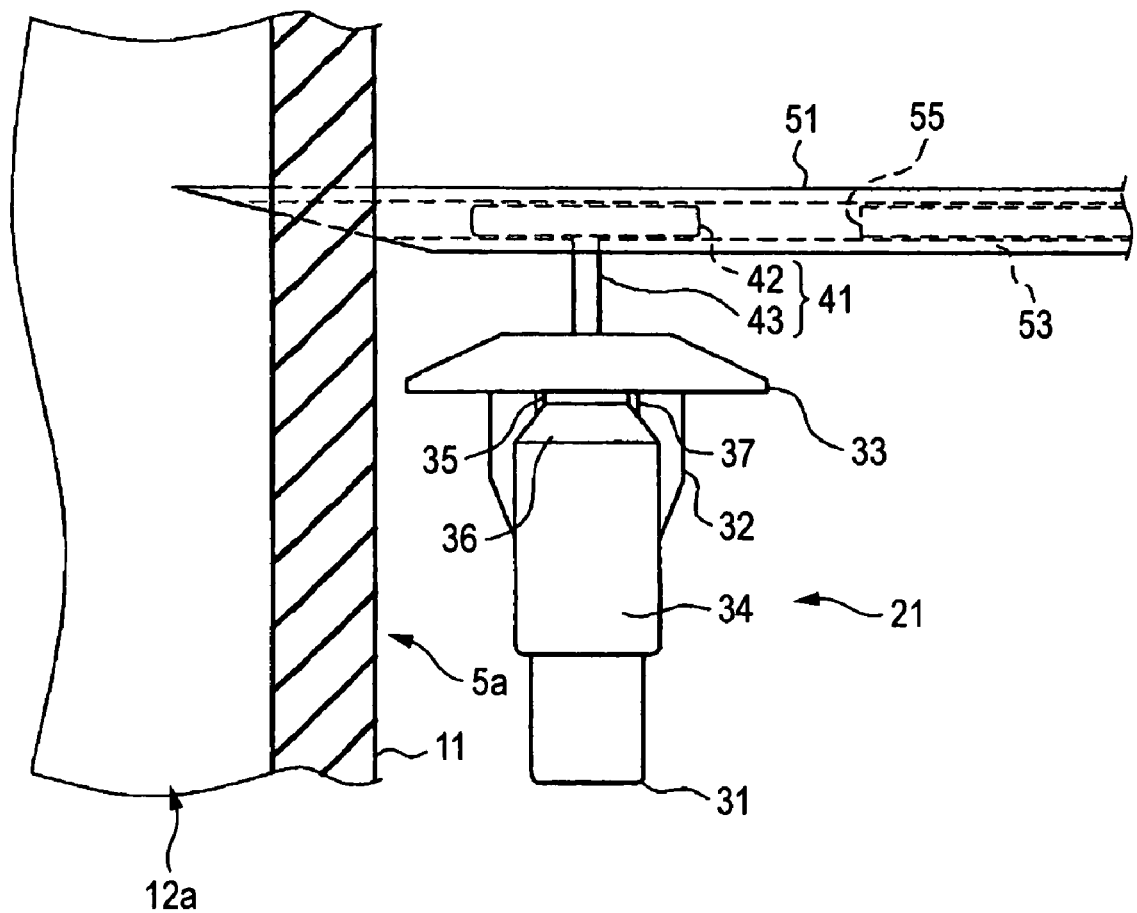
FIG. 4 is a view for explaining the attaching process of the clip.

Now referring to the drawings, an explanation will be given of the process of attaching the clip 21 to the weather strip body 5a. First, as shown in FIG. 4, the retaining piece 42 is set on the inner peripheral side of the insertion pin 51 and the insertion pin 51 is pierced nearly vertically into the bottom of the base 11.

Figure 5:
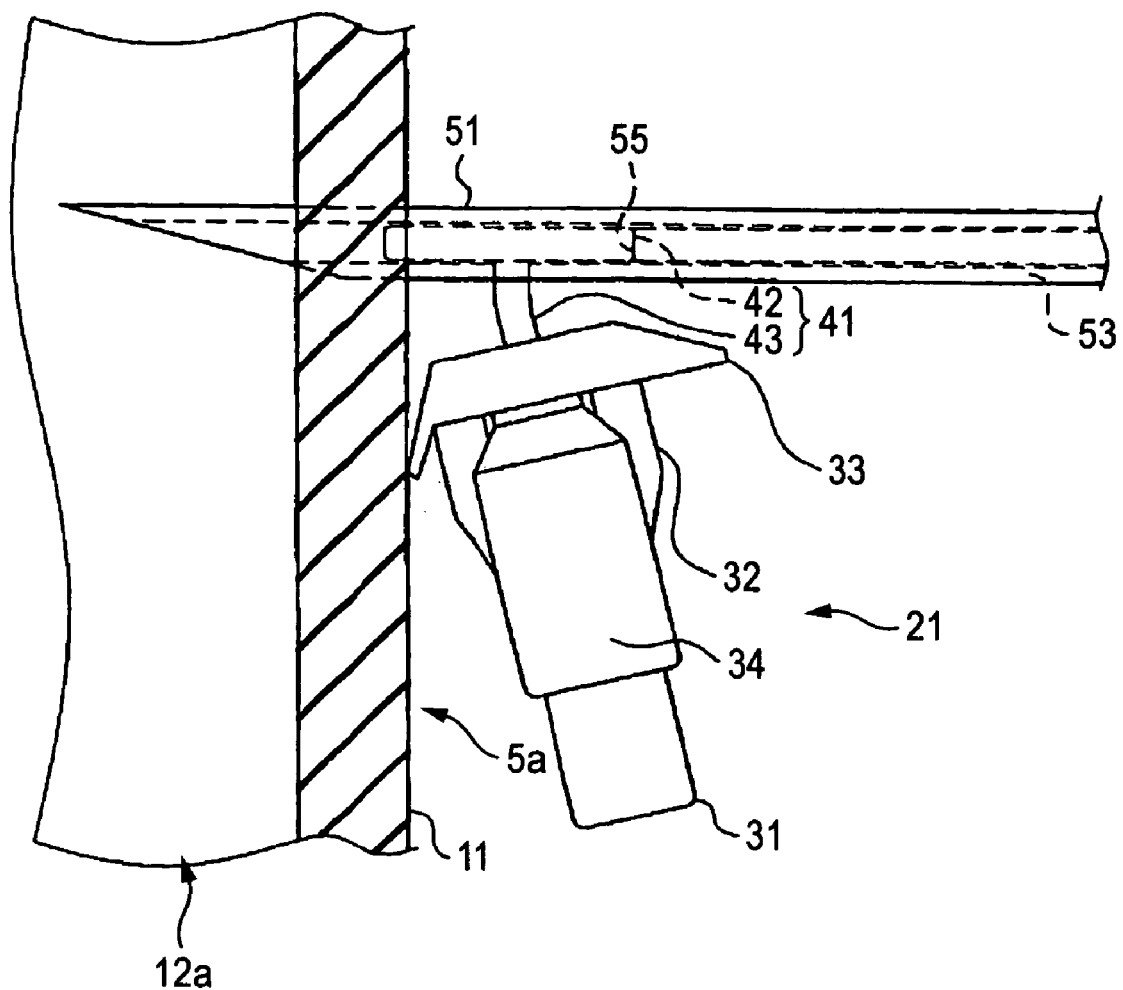
FIG. 5 is a view for explaining the attaching process of the clip.

As shown in FIG. 5, the insertion pin 51 is completely pierced into the base 11 so that the tip of the insertion pin 51 (an opening formed at the tip of the insertion pin 51) is located at the first hollow section 12a. Thereafter, the pushing rod 55 is slid toward the insertion pin 51. Thus, the retaining piece 42 is pushed by the pushing rod 55 so that it is pushed out from the tip of the insertion pin 51. On the way, the flange 33 is brought into contact with the base 11. However, the coupling portion 43 and flange 33 warp correspondingly so that the pushing rod 55 can be pushed to the further inner part. Thus, the entire retaining piece 42 can be pushed out from the tip of the insertion pin 51 to the inside of the first hollow section 12a.

Figure 6:
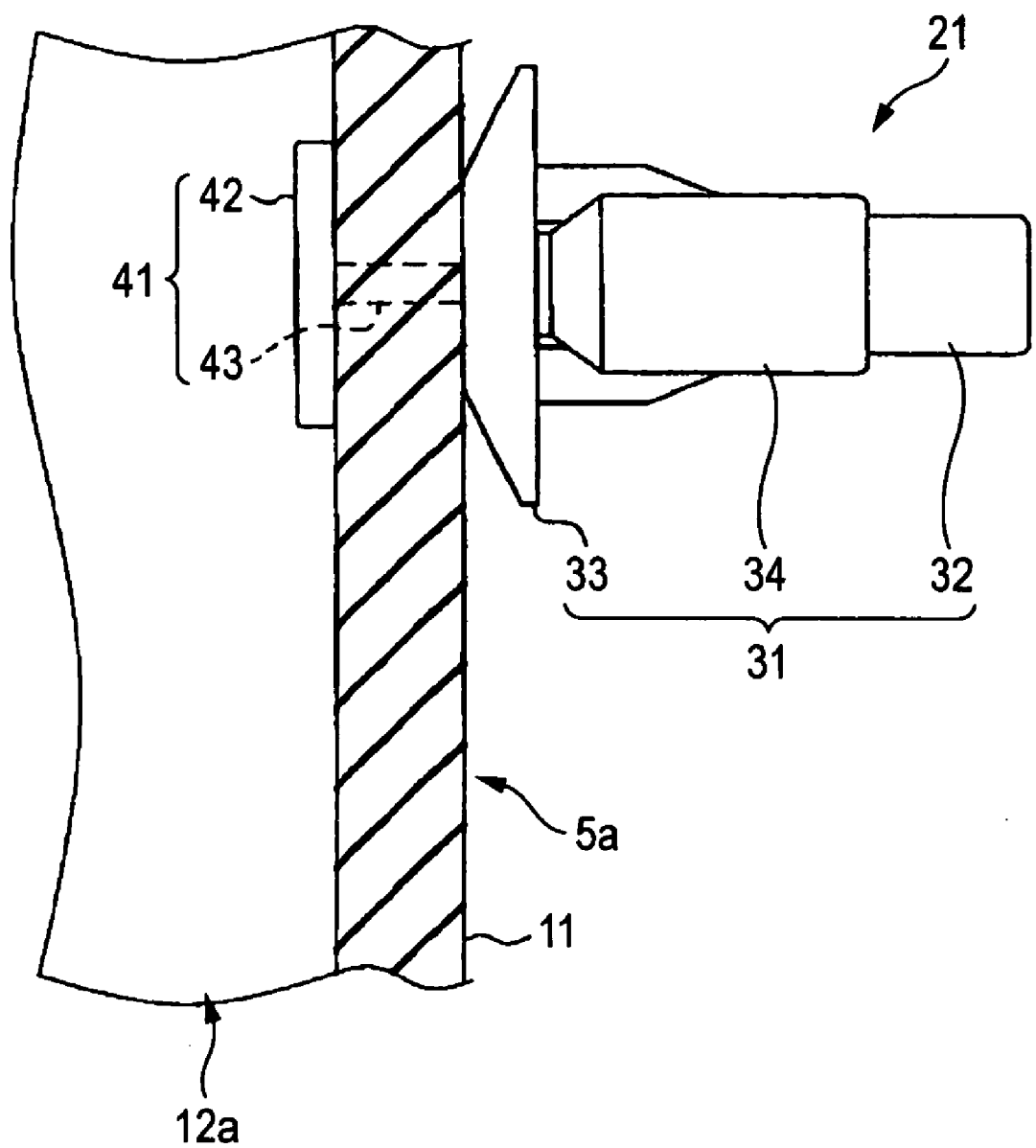
FIG. 6 is a view for explaining the attaching process of the clip.

Further, as shown in FIG. 6, after the retaining piece 42 is pushed out from the tip of the insertion pin 51, the insertion pin 51 is pulled out from the base 11. At this time, the retaining piece 42 left in the first hollow section 12a will be naturally displaced because of the elastic force of the coupling portion 43 so that the longitudinal direction of the retaining piece 42 is the direction (for example, in FIG. 2, longitudinal direction of the door weather stop 5) perpendicular to the normal direction of the base 11. In this way, since the retaining piece 42 is left inside the first hollow section 12a, the retaining piece 42 is retained to the inner face of the base 11. Additionally, in passing the retaining piece 41, the base 11 through which the coupling portion 43 penetrates is not cut away or scraped off in its substance, but is only pierced with the insertion pin 51. So, after the insertion pin 51 is pulled out, the quantity of the substance having been expanded will shrink so as to be brought into pressure contact with the coupling portion 43.

After the attaching process, the weather strip body 5a attached with the clip 21 is cut with a predetermined size by a cutter 67. Thereafter, both ends of the weather strip body 5a cut with the predetermined size are connected to provide the ring-shaped door weather strip 5.

Hitherto, as described in detail, the door weather strip 5 according to this embodiment is provided with the clip 21 having the engaging part 41 fit in and engaged with the attaching hole 22. The clip 21 is attached to the base 11 by feeding the retained part 42 into the first hollow section 12a through the inner peripheral side of the insertion pin 51 pierced in the base 11. Therefore, in order to attach the clip 21 to the base 11, the operation of cutting away or scraping the substance of the base 11 to form an opening can be done without. Thus, it is possible to avoid generation of scraps attendant on forming the opening, thereby omitting the labor of removing the generated scraps and device (sucking device). As a result, the manufacturing workability and the quality can be improved. Further, in a sense, since the clip 21 can be attached to the base 11 in a single step, the working efficiency can be improved as compared with the prior art necessitating the step of previously forming the opening in the base 11 and the step of passing the clip 21 through the opening.

Further, the distance from the retaining piece 42 to the flange 33 is smaller than the thickness of the base 11 sandwiched between the retaining piece 42 and the flange 33. This prevents the wobbling of the clip 21 for the base 11. As a result, the attached state of the door weather strip 5 to the door frame 7 can be stabilized.

Further, since the coupling portion 43 is flexible, in passing the retained part 41 through the base 11, the shape of the coupling portion 43 can be changed correspondingly. Thus, the retaining piece 42 can be pushed into the first hollow section 12a comfortably and surely.

Further, since the circumferential length of the retaining piece 42 is longer than that of the coupling portion 43, the retaining piece 42 has higher rigidity than the coupling portion 43. For this reason, after the clip 21 has been attached to the weather strip body 5a, it is possible to avoid the situation where the retained part 41 comes off the base 11 owing to flexing of the retaining piece 42.

Further, in the prior art in which the clip is passed the opening previously formed in the base 11, first, the one end of the retaining piece projecting sideward from the coupling portion is passed through the passing-through hole and afterward the other end of the retaining piece is screwed in the passing-through hole by rotating the retained part around the boundary between the retaining piece and the coupling portion while pushing it. On the other hand, in this embodiment, the single operation of piercing the insertion pin 51 and sliding the pushing rod 55 has only to be carried out. Thus, the construction of the inserting means and passing step can be simplified. Further, as compared with the case where the retained part is inserted while it forcibly expands the substance of the base 11 as in the prior art, in this embodiment, the retained part 41 is not required to has so high rigidity (Namely, the retained part 41 can be made thin). For this reason, the material to be employed can be reduced, thereby saving resource.

This invention should not be limited to the embodiment described above, but may be carried out in the following manner. It is needless to say that other applications or modifications not explained below can be carried out.

(a) The shape of the clip 21 employed in the above embodiment is not particularly limited, but has only to include the engaging part 31 fit in and engaged with the attaching hole 22 and a retained part 41 passed into the inside of the first hollow section 12a by the insertion pin 51 and retained to the base 11. For example, the auxiliary plate 37 may couple the tip of the projection 35 and the flange 33 or may be omitted. Further, the flange 33 may have a smaller diameter than that illustrated. In addition, the axis 32 may be shortened so that the supporting piece 34 extends out from the end of the axis 32 where the flange 33 is not provided. The retaining piece 42 and coupling portion 43 may not circular in their section. For example, their sectional shape may be elliptic, square or triangular.

The retaining piece 42, which must passed to the inner face side of the base 11 through the inner peripheral side of the insertion pin 51, desirably has a linear shape rather than a flexed shape. Further, although not particularly referred to in the above embodiment, as regards the clip 21, the engaging part 31 and retained part 41 may be formed simultaneously by die molding, or may be formed separately and coupled afterward.

Figure 10:
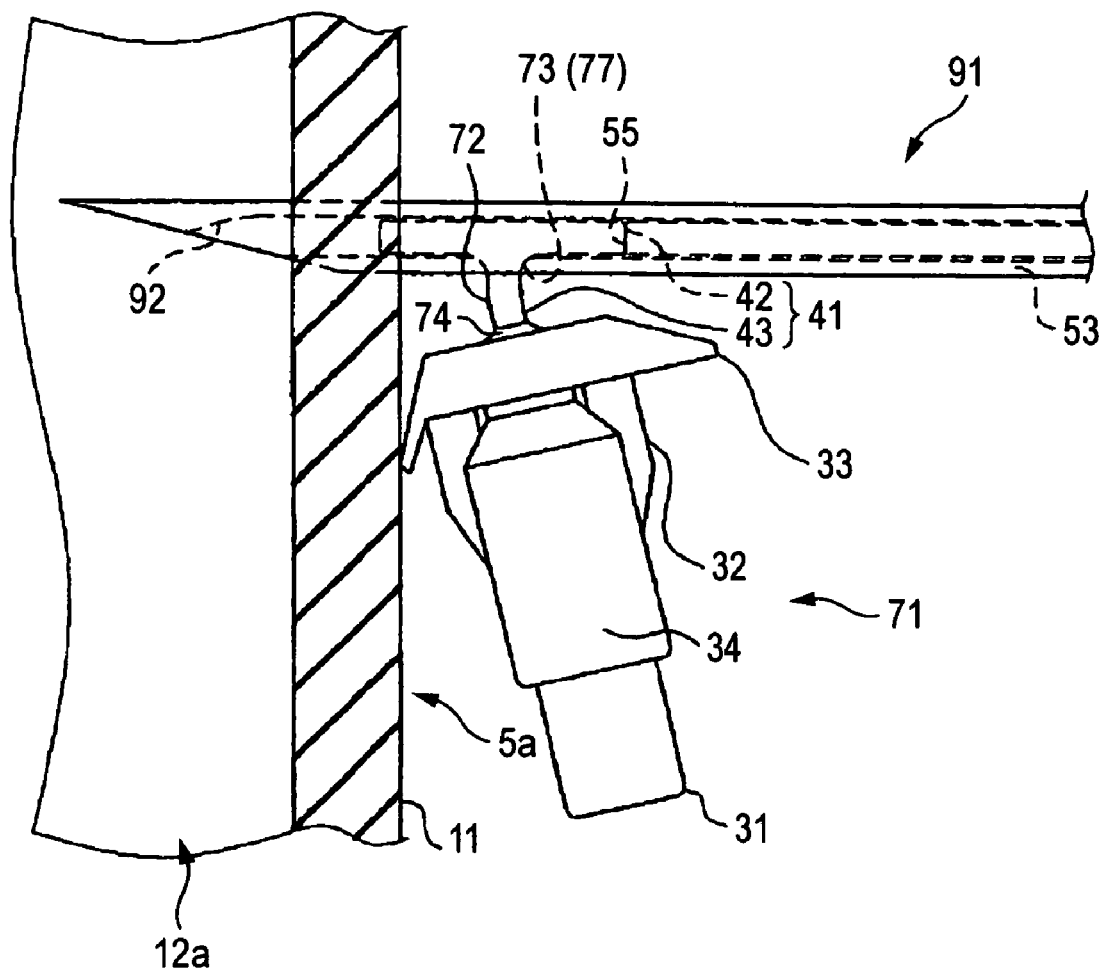
FIG. 10 is a schematic view of the clip and inserting means in a further embodiment.

(b) As a modification of the clip 21, a clip 71 as shown in FIGS. 9A and 9B and FIG. 10 may be adopted. Further, as a modification of the inserting means, an inserting means equipped with an insertion pin 91 as shown in FIG. 10 may be adopted. Referring to the drawings, the clip 71 and insertion pin 91 will be explained below in detail. The clip 71 and inserting means (insertion pin 91) as shown in FIGS. 9A, 9B and 10 have basically the same construction as that of the clip 21 and inserting means in the above embodiment. For convenience of explanation, in the explanation, the same component names and component reference numbers are employed.

In the clip 71, the coupling portion 43 extending in the direction perpendicular to the retaining piece 42 from the nearly central area in the longitudinal direction of the retaining piece 42 includes a retaining side reinforcing portion 73 thicker than the remaining general region 72 at a boundary to the retaining piece 42 and a flange side reinforcing portion 74 thicker than the remaining general region 72 at a boundary to the flange 33.

The retaining side reinforcing portion 73 is constructed by making the coupling portion 43 thick in the extending direction of the retaining piece 42. In the direction perpendicular to the extending direction (longitudinal direction) of the retaining piece 42, the retaining side reinforcing portion 73 has nearly the same wall thickness as that of the general region 72. Namely, even where the retaining side reinforcing portion 73 is formed, it is not necessary to extend the width of the slit 53 formed correspondingly in the insertion pin 91; and the area of the outer periphery of the retaining piece 42 supported by the inner periphery of the insertion pin 91 (insertion pin 51) is equal to that in the above embodiment. In addition, as shown in FIG. 9B and FIG. 10, when seen from the direction perpendicular to the extending direction of the retaining piece 42, the retaining side reinforcing portion 73 (slopes 77) are laterally symmetrical, and the sectional shape when the retaining side reinforcing portion 73 is cut in the direction perpendicular to the longitudinal direction of the coupling portion 43 is nearly rectangular. Namely, the retaining side reinforcing portion 73 is constructed by increasing the wall thickness of the coupling portion 43 toward the forward side in the direction of inserting the retaining piece 42 in the base 11 and also increasing it toward the opposite side. The slopes 77 are formed by rounded surfaces located on oppose sides of the coupling portion 43, so that the rounded surfaces are directed along the extending direction of the retaining piece 42.

Further, the wall thickness of the retaining side reinforcing portion 73 gradually and continuously increases toward the end on the retaining piece 42 side of the coupling portion 43. Further, in the retaining side reinforcing portion 73, its region (hereinafter referred to as the slope 77) located on the outer peripheral side of the coupling portion 43 than the general region 72 is curved to be concave toward the retaining piece 42 side. Namely, the corner where the coupling portion 43 and the retaining piece 42 intersect is R-shaped.

The flange side reinforcing portion 74 is constructed by making the coupling portion 43 thick over the entire zone in the circumferential direction of the coupling portion 43. Further, the wall thickness of the flange reinforcing portion 74 gradually and continuously increases toward the end on the flange side 33 side of the coupling portion 43. Further, the outer periphery of the flange reinforcing portion 74 is curved to be concave toward the flange 33 side. Namely, the corner where the coupling portion 43 and the flange 33 intersect is R-shaped.

At the tip of the insertion pin 91 shown in FIG. 10, a guide 92 projecting toward the slit 53 on the inner peripheral side is formed. The projecting quantity (wall thickness) of the guide 92 gradually and continuously increases toward the tip of the insertion pin 91. For this reason, when the retaining piece 42 is pushed out from the tip of the insertion pin 91, the retaining piece 42 is guided toward the engaging part 31 by the guide 92 (inclinedly deformed toward the side where the slit 53 is formed). However, it should be noted that the insertion pin 91 has basically the same outer shape as that of the insertion pin 51 in the above embodiment and extends linearly without curving and flexing on the way.

As described above, in this embodiment, in the coupling portion 43, at its boundary to the retaining piece 42, the retaining side reinforcing portion 73 having the larger wall thickness than that of the general region 72 is provided. In addition, the wall thickness of the retaining side reinforcing portion 73 gradually and continuously increases toward the end on the retaining piece 42 side of the coupling portion 43. Thus, when the clip 71 is deformed so that the angle formed by the coupling portion 43 and the retaining piece 42 spreads, the stress applied to the boundary between the coupling portion 43 and the retaining piece 42 can be dispersed (concentration of the stress is suppressed). Accordingly, when the clip 71 is attached to the weather strip 5a (base 11), or stress is applied in the direction of come-off of the clip 71 in the attached state of the clip 71 to the base 11, it is possible to suppress the situation where the clip 71 is broken at the boundary between the coupling portion 43 and the retaining piece 42.

Further, in this embodiment, in the coupling portion 43, at its boundary to the flange 33, the flange side reinforcing portion 74 thicker than the general region 72 is provided and its wall thickness of the flange side reinforcing portion 74 gradually and continuously increases toward the end on the flange 33 side of the coupling portion 43. Thus, when the clip 71 is deformed so that the angle formed by the coupling portion 43 and the flange 33 spreads, the stress applied to the boundary between the coupling portion 43 and the flange 33 can be dispersed (concentration of the stress is suppressed). Accordingly, when the clip 71 is attached to the base 11, or stress is applied in the direction of come-off of the clip 71 in the attached state of the clip 71 to the base 11, it is possible to suppress the situation where the clip 71 is broken at the boundary between the coupling portion 43 and the flange 33.

Further, although the coupling portion 43 is made thick at its boundary to the retaining piece 42 and at its boundary to the flange 33, the entire coupling portion 43 is not necessarily made thick. Therefore, it is possible to avoid the situation where in attaching the clip 71 to the base 11, the attaching workability is deteriorated owing to difficulty of deformation of the coupling portion 43.

Meanwhile, for example, if a step is formed in the retaining side reinforcing portion 73, in passing the retaining piece 42 to the base 11, such a step may be caught by the base 11. However, like this embodiment, by adopting the construction in which the wall thickness of the retaining side reinforcing portion 73 gradually and continuously changes, interference between the retaining side reinforcing portion 73 and the base 11 in passing the retaining piece 42 can be suppressed. As a result, the retaining side reinforcing portion 73 can be passed to the base 11 relatively smoothly so that it is possible to avoid the situation where in attaching the clip 71 to the base 11, the attaching workability of the clip 71 to the base 11 is deteriorated owing to the provision of the retaining side reinforcing portion 73.

Particularly, in the retaining side reinforcing portion 73, its slope 77 located on the outer peripheral side of the coupling portion 43 than the general region 72 is curved to be concaved toward the retaining piece 42 side. This more surely provides an operational advantage that in attaching the clip 71 to the base 11, the retaining side reinforcing portion 73 can be passed to the base 11 relatively smoothly. Further, in passing the retaining piece 42 to the base 11, the retaining side reinforcing portion 73 can be correspondingly changed in its shape. Thus, it is possible to suppress the situation where the workability of attaching the clip 71 to the base 11 is deteriorated owing to the provision of the retaining side reinforcing portion 73.

Further, the retaining side reinforcing portion 73 is constructed by making the coupling portion 43 thick in the extending direction of the retaining piece 42. In addition, in the direction perpendicular to the extending direction of the retaining piece 42, the retaining side reinforcing portion 73 has nearly the same wall thickness as that of the general region 72. For this reason, interference between the retaining side reinforcing portion 73 and the insertion pin 91 (inner periphery of the insertion pin 91) can be suppressed. So, in attaching the clip 71 to the base 11, the retaining piece 42 can be fed out stably and smoothly to the inner face side of the base 11 (first hollow section 12a). Further, in feeding out the retaining piece 42 to the inner face side of the base 11, interference between the retaining side reinforcing portion 73 and the base 11 can be suppressed. So, it is possible to suppress the situation where in attaching the clip 71 to the base 11, the attaching workability of the clip 71 to the base 11 (inserting workability) is deteriorated owing to the provision of the retaining side reinforcing portion 73. Further, it is possible to suppress the situation where the coupling portion 43 is difficult to be deformed due to the fact that the rigidity of the retaining side reinforcing portion 73 becomes excessively high and so the passing workability of the retaining piece 42 to the base 11 is deteriorated.

Further, the flange side reinforcing portion 74 is constructed by making the coupling portion 43 thick over the entire zone in the circumferential direction of the coupling portion 43. For this reason, where such stress as displacing the door weather strip 5 in its longitudinal direction or vehicle-width direction is applied to the door weather strip 5 in the state attached to the retainer 8, it is possible to suppress more surely the situation where the clip 71 is broken at the boundary between the coupling portion 43 and the flange 33. Incidentally, unlike the retaining side reinforcing portion 73, the flange side reinforcing portion 74 is not required to be passed to the base 11. So, even if it is made thick over the entire zone of the coupling portion 43, the attaching workability (inserting workability) will not be deteriorated.

At the tip of the insertion pin 91, the guide 92 is formed for guiding the retaining piece 42 pushed out from the tip of the insertion pin 91 toward the engaging part 31. Because of presence of the guide 92, the operation of inclining the retaining piece 42 pushed to the inner face side of the base 11 can be smoothly performed. Further, in pushing out the retaining piece 42 from the tip of the insertion pin 91, it is possible to suppress the situation where such force as extending the coupling portion 43 is applied the coupling portion 43. So, the burden applied to the boundary (the retaining side reinforcing portion 73) between the coupling portion 43 and the retaining piece 42 can be relaxed. Accordingly, it is possible to prevent more surely the situation where the clip 71 is broken at the boundary between the coupling portion 43 and the retaining piece 42.

Further, the retaining side reinforcing portion 73 is constructed by increasing the wall thickness of the coupling portion 43 toward the forward side in the direction of inserting the retaining piece 42 in the base 11 and also increasing it toward the opposite side. For this reason, in setting the retaining piece 42 on the inner peripheral side of the insertion pin 91, it is not necessary to confirm the direction of the clip 71 (whether or not the slopes 77 are oriented toward the tip side of the insertion pin 91), thereby improving the workability. Further, when stress is applied in the direction of come-off of the clip 71 in the attached state of the clip 71 to the base 11, it is possible to suppress the situation where the clip 71 is broken at the boundary between the coupling portion 43 and the retaining piece 42.

In addition, the outer shape of the insertion pin 91 is formed in a linear shape. For example, where the tip of the insertion pin as well as its outer shape is flexed or curved in order to guide the retaining piece pushed out from the tip of the insertion pin toward the engaging part, in passing the insertion pin through the base (piercing), the insertion pin may be difficult to be pushed in. Further, the hole formed in the base by piercing the base with the insertion pin may not be formed perpendicular and straight to the base (straight to the thickness direction of the base). On the other hand, if the insertion pin 91 is linear, in passing the insertion pin 91 through the base 11, the insertion pin 91 can be easily pushed in and the hole formed in the base by perpendicularly piercing the base with the insertion pin can be formed perpendicularly and straight to the base 11. Therefore, the operation of passing the insertion pin 91 through the base 11 can be done relatively easily, and the coupling portion 43 of the clip 71 in the state attached to the base 11 can be extended perpendicularly and straight to the base 11. Thus, the attached state of the clip 71 can be stabilized.

Additionally, the retaining side reinforcing portion 73 may be constructed so that the coupling portion 43 can be made thick over the entire zone in the circumferential direction of the coupling portion 43. Further, the retaining side reinforcing portion 73 may be constructed so that the sectional shape when the retaining side reinforcing portion 73 is cut in the direction perpendicular to the longitudinal direction fo the coupling portion 43 is elliptic. Namely, the retaining side reinforcing portion 73 may be constructed so that no step is formed on the slope 77 in the circumferential direction of the coupling portion 43 and in the circumferential direction of the retaining piece 42. Further, the slope 77 may be curved to be concave toward the flange 33 side, or may not be curved. In addition, the manufacturing method of the insertion pin 91 should not be particularly limited, but in forming the guide 92, forging, cutting or welding may be carried out. In this embodiment, the retaining side reinforcing portion 73 is constructed by increasing the wall thickness of the coupling portion 43 toward the forward side in the direction of inserting the retaining piece 42 in the base 11 and also increasing it toward the opposite side. However, the retaining side reinforcing portion 73 may be constructed by increasing the wall thickness of the coupling portion 43 toward only the forward side in the direction of inserting the retaining piece 42 in the base 11. Namely, in this embodiment, although the pair of slopes 77 are provided, either one thereof may be omitted.

(c) In the above embodiment, the weather strip is realized as the door weather strip 5 for the front door. However, the region of the door to which the door weather strip 5 is attached should not be limited, but for example, the weather strip can be realized as that door weather attached to a rear door. Further, the weather strip can be realized as not only the door weather strip but also the weather strip (opening trim) attached to the edge of the door opening 2. Further, the weather strip according to this invention can be realized as the weather strip (sealing member) attached to not only the peripheral edge of the door or peripheral edge of the door opening, but also the peripheral edge or distal edge of the opening formed in the automobile body (opening of an engine room, trunk room, roof, etc.), peripheral edge of the door for opening/closing the opening (bonnet, trunk lid, loop panel., etc.) or distal edge of a cowl louver.

Further, in the above embodiment, the weather strip is realized as the weather strip equipped with the hollow seal 12. However, it can be realized as the weather strip equipped with a lip-like seal instead of the hollow seal 12. Further, it can be also realized as the weather strip equipped with the seal 12 and also a seal lip extending out from the vicinity of the boundary between the seal 12 and the lip 14 toward the peripheral edge of the door opening 2 when the door 3 is closed, the seal lip being brought into pressure-contact with the peripheral edge of the door opening 2 when the door 3 is closed.

In addition, in the above embodiment, the door weather strip 5 is attached to the door frame 7 in such a manner that the base 11 is fit in the nearly C-shaped sectional retainer 8 and the clip 21 is fit in the attaching hole 22 formed in the retainer 8. However, the door weather strip 5 may be attached to the door frame 7 in such a manner that the clip 21 is only fit in the attaching hole 22.

(d) In the above embodiment, the base 11 and seal 12 (weather strip body 5a) are made of EPDM, and the clip 21 is made of synthetic resin such as polyoxymethylene or polyamide, but may be made of the other material. For example, the base 11 and the seal 12 may be made of TPO (olefinic thermoplastic elastomer) and the clip 21 may be made of polyethylene, polypropylene, TPO, TPV (dynamic bridging olefinic thermoplastic elastomer).

(e) In the above embodiment, the door weather strip 5 is attached to the door frame 7 in such a manner that the clip 21 is fit in the attaching hole 22 and also the base 11 is fit in the retainer 8. However, in place of omitting the retainer 8, using both double-faced adhesive tape put on the bottom of the base 11 and clip 21, the door weather strip 5 may be attached. It is needless to say that the door weather strip 5 may be attached using only the clip 21.

Further, in the above embodiment, the clip 21 is attached at regular intervals along the longitudinal direction of the door weather strip 5 to the base 11. However, without being limited to such a configuration, at least a part of the door weather strip 5 in the longitudinal direction may be attached to the door frame 7 using the clip 21. For example, the most part of the door weather strip 5 may be attached to the door frame 7 by fitting the base 11 in the retainer 8 and only the area where no retainer is formed may be attached using the clip 21.

(f) In the above embodiment, the door weather strip 5 (weather strip body 5a) is formed of only the extrusion molding but may be composed of both the extrusion-molded part and a die-molded part. Further, the door weather strip 5 may not be integrated in a ring shape.

As in the above embodiment, where the weather strip body 5a is formed of only the extrusion molding, the operation of attaching the clip 21 to the base 11 can be automated by the inserting means in an assembly-line system in the manufacturing process of the door weather strip 5. As a result, a troublesome operation of manually attaching the clip 21 is not needed so that the manufacturing process can be simplified, thereby enhancing the working efficiency. On the other hand, where the die-molded part is provided and the clip 21 is also attached to the die-molded part, the inserting means can be constructed in a hand tool (for example, providing an operation unit for sliding the pushing rod 55) to carry out the attaching operation.

Figure 8:
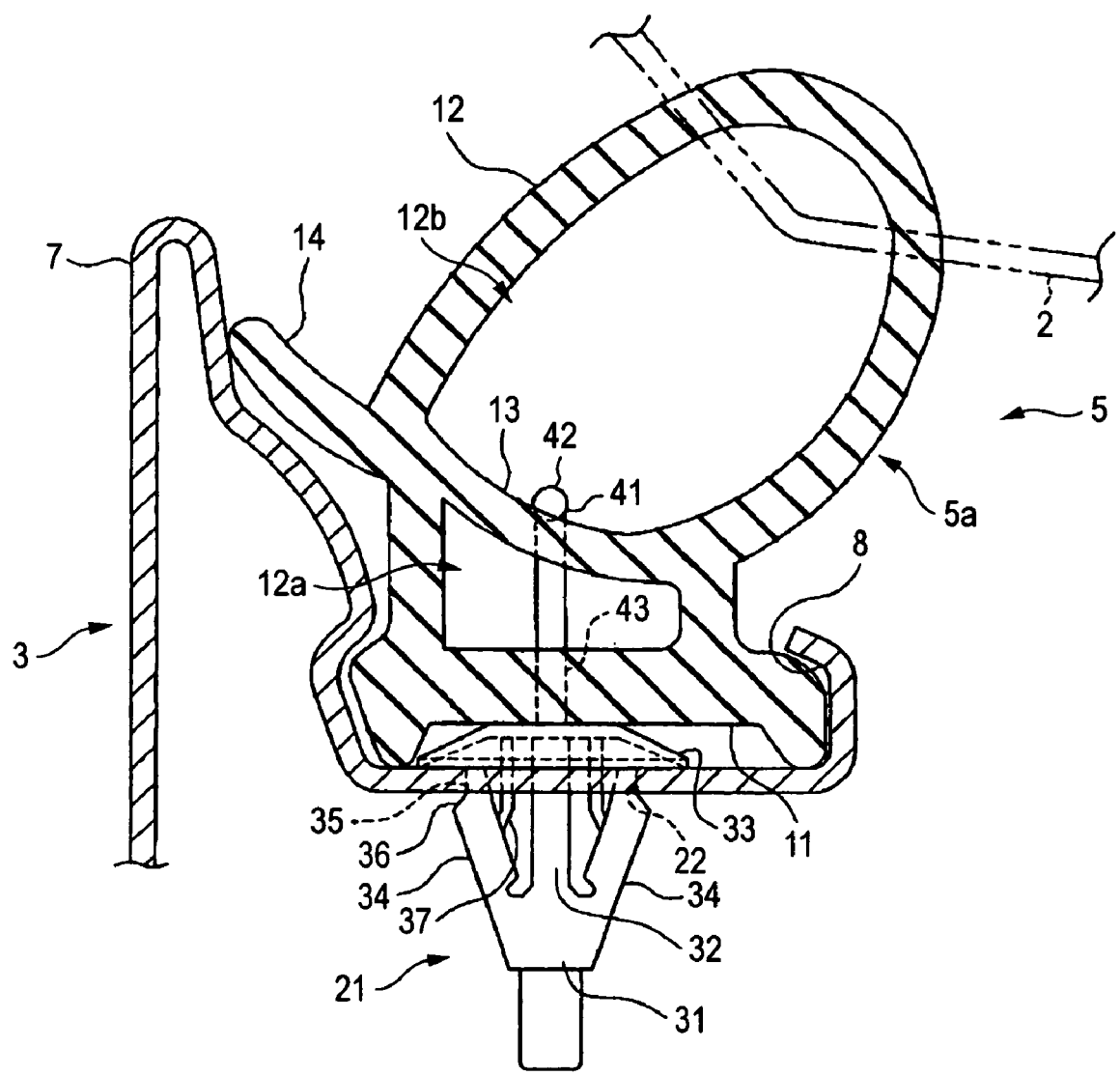
FIG. 8 is a sectional view of the door weather strip according to another embodiment of this invention.

(g) In the above embodiment, the retaining piece 42 is inserted in the first hollow section 12a so that it is retained to the base 11. However, as shown in FIG. 8, the retaining piece 42 may be inserted in the second hollow section 12b so that it is retained to the bridge 13. Where this configuration is adopted, the base 11 and bridge 13 sandwiched between the retaining piece 42 and flange 33 in the retained state of the retained part 41 constitute an attaching base.

What is claimed is:

1. A weather strip comprising an attaching base attached to an attached portion, a seal extending out from said attaching base and a fastening tool attached to the attaching base, wherein said fastening tool includes an engaging part fitted in and enagageable with an attaching hole formed in said attached portion and a retained part retained to said attaching base;
    said engaging part includes a rod-like axis, a flange extending from the one end thereof and a supporting portion extending outwardly and toward said flange from the outer periphery of said axis;
    said retained part includes a retaining piece located on the inner face side of said attaching base and a coupling portion extending in a direction crossing the longitudinal direction of said retaining piece to pass through said attaching base and coupled with said flange;
    said engaging part projecting from said attaching base is fit in said attaching hole so that the peripheral edge of said attaching hole is sandwiched between said flange and the tip of said supporting portion; and
    using an inserting means equipped with an insertion pin which is nearly cylindrical and sharp-pointed, the insertion pin is pierced into the attaching base from its bottom side so that said retaining piece is fed through the inner peripheral side of said insertion pin to the inner face side of the attaching base opposite to said bottom side, thereby attaching said fastening tool to said attaching base,
    wherein said coupling portion includes a retaining side reinforcing portion which is thicker than its remaining general region at its boundary to said retaining piece, and
    the wall thickness of said retaining side reinforcing portion increases gradually and continuously toward the end on the side of said retaining piece of said coupling portion.

2. A weather strip according to claim 1, wherein the distance from said retaining piece to said flange is set to be smaller than the thickness of said attaching base sandwiched between said retaining piece and said flange in the retained state of said retained part.

3. A weather strip according to claim 1, wherein said coupling portion is flexible.

4. A weather strip according to claim 1, wherein said retaining piece has higher rigidity than that of said coupling portion.

5. A weather strip according to claim 1, wherein said retaining side reinforcing portion is constructed by making said coupling portion thick in an extending direction of said retaining piece, and the wall-thickness of said retaining side reinforcing portion in a direction perpendicular to the extending direction of said retaining piece is equal or nearly equal to that of said general region.

6. A weather strip according to claim 1, wherein said coupling portion has a flange side reinforcing portion which is thicker than its remaining general region at its boundary to said flange, and
    the wall thickness of said flange side reinforcing portion increases gradually and continuously toward the end on the side of said flange of said coupling portion.

7. A weather strip according to claim 1, wherein a rounded surface is formed on a side of the coupling portion at a boundary to the retaining piece and the round surface is directed along an extending direction of the retaining piece.

8. A method for manufacturing a weather strip, comprising a weather strip comprising an attaching base attached to an attached portion, a seal extending out from said attaching base and a fastening tool attached to the attaching base, wherein said fastening tool includes an engaging part fitted in and enagageable with an attaching hole formed in said attached portion and a retained part retained to said attaching base, said engaging apart includes a rod-like axis, a flange extending from the one end thereof and a supporting portion extending outwardly and toward said flange from the outer periphery of said axis, said retained part includes a retaining piece located on the inner face side of said attaching base and a coupling portion extending in a direction crossing the longitudinal direction of said retaining piece to pass through said attaching base and coupled with said flange, said engaging part projecting from said attaching base is fit in said attaching hole so that the peripheral edge of said attaching hole is sandwiched between said flange and the tip of said supporting portion, and using an inserting means equipped with an insertion pin which is nearly cylindrical and sharp-pointed, the insertion pin is pierced into the attaching base from its bottom side so that said retaining piece is fed through the inner peripheral side of said insertion pin to the inner face side of the attaching base opposite to said bottom side, thereby attaching said fastening tool to said attaching base, the method comprising:
    a molding step of molding a weather strip body including said attaching base and said seal; and
    an attaching step of attaching said fastening tool to said weather strip body using said inserting means, wherein said inserting means includes an insertion pin nearly cylindrical for passing said retaining piece on its inner peripheral side and a pushing means capable of pushing out said retaining piece located on the inner peripheral side of said insertion pin from the tip of said insertion pin;
    said insertion pin is formed in a sharp-pointed shape, extends in the longitudinal direction and is provided with a slit having a width permitting said coupling portion to pass; and
    said attaching step includes a step of piercing said insertion pin with said retaining piece set on its inner peripheral side into said attaching base, a step of pushing out said retaining piece toward the inner face side of said attaching base by said pushing means, and a step of extracting said insertion pin.

9. A method for manufacturing a weather strip according to claim 8, wherein said slit has a width preventing said retaining piece inserted in said insertion pin from coming off.

10. A method for manufacturing a weather strip according to claim 8, wherein at the tip of said insertion pin, a guide projecting toward said slit is formed and the projecting quantity of said guide increases gradually and continuously toward the tip of said insertion pin.

* * * * *